Patented Feb. 23, 1943

2,312,088

UNITED STATES PATENT OFFICE 2,312,088

BRONZING MATERIAL

Cornelius S. Fleming, Los Angeles, Calif.

No Drawing. Application October 25, 1938,
Serial No. 236,905

19 Claims. (Cl. 106—253)

My invention relates to bronzing materials and particularly to methods and materials for improving the characteristics of bronzing compositions. The present application is a continuation in part of my earlier filed copending applications Serial No. 180,594, filed December 18, 1937, and Serial No. 155,735 filed July 26, 1937.

In the preparation of bronzing compositions, such as aluminum paints and similar coating compositions, it has been common practice to prepare the bronzing powder in the form of a paste suitable for mixing with a vehicle at the time the composition is to be used. The effectiveness of the coating composition depends to large extent upon the property of a flaked bronzing powder to leaf out and produce an effective coverage of the surface to which it is applied. The clean flaked particles of bronzing powders, such as aluminum, do not have the property of leafing sufficiently to be practicable for general use; and it has become common practice to treat the flaked particles with stearic or similar fatty acid, as an agent for improving the leafing property of the powder. The stearic acid is commonly mixed with the powder in a ball mill, the treatment being so carried out that the powder is flaked and polished, and at the same time intimately mixed with the leafing agent. The material, so treated, is reduced to the consistency of a paste; and is added to a vehicle in appropriate amounts as required.

The pastes so produced have been found to be defective in that there is a relatively rapid deterioration of the luster and leafing properties of the paste. Such deterioration occurs to some extent in the unopened containers, when allowed to stand for a period of months; and coating compositions made from pastes which have stood for different periods of time, show a progressive loss of luster and leafing properties. After opening the container, the deterioration has been relatively rapid, especially if exposed to the atmosphere; and is greatly accelerated by heat. The presence of moisture has been found to be very detrimental to the pastes.

The manufacture of coating compositions from such pastes has also presented numerous difficult problems which many have unsuccessfully attempted to solve. Coating compositions, such as heretofore produced, have been defective in various ways; and efforts to overcome one defect have resulted in bringing about other objectionable characteristics. As a result, commercial practice has been confined to products which represent a compromise between conflicting factors, without eliminating or satisfactorily curing the defects.

For example, vehicles comprising a varnish-like base, including gums or resin, have been used, but have been found to be defective in that they have lacked durability; and are injured by heat and by the presence of moisture. Reasonably good leafing of the bronzing powder has been obtained in such vehicles when freshly mixed, but if allowed to stand for any material length of time, the bronzing powder settles out as a dense body, and the leafing property is seriously impaired, if not completely destroyed.

Oil base vehicles have been found to offer greater durability; but the difficulty in obtaining and retaining the leafing property of the bronzing powder has been even greater than in the oil and resin base vehicles.

The films produced by such compositions have been far from satisfactory. When used as a priming coat for wood, concrete, and similar porous surfaces, the penetration has been poor, and the film tends to pull away when another coating material is applied thereover. The adherence to smooth metal surfaces, such as iron, has been poor. There has been a marked tendency for the films produced from such compositions to crack or "alligator," especially when applied to materials such as prepared roofings; and both the appearance and effectiveness have been seriously impaired. Efforts to correct such defects have resulted in compositions in which the leafing properties of the bronzing powder has been impaired, and in which the luster of the bronzing powder is destroyed if allowed to stand even for a relatively short time. No effective means has heretofore been known for restoring the leafing property and luster of the bronzing powder once it has been lost, either in the powder or paste itself, or in a coating composition to which it has been added.

It is among the objects of my invention to correct such defects in bronzing compositions such as heretofore known or produced; and to provide improved compositions containing materials having the property of producing improved leafing, increased stability, and improved and more permanent luster.

Another object is to provide an improved agent which may be incorporated directly with a bronzing powder or paste, or with a vehicle to be used with bronzing powder or paste, or with a bronzing paint, to obtain stability of the leafing property and luster of the powder.

A further object is to provide an agent having the property of restoring the leafing property and luster to bronzing compositions in which those properties have become lost or impaired.

Another object is to provide a bronzing composition which will withstand relatively high temperatures; and which is not materially impaired by the presence of moisture either in the composition itself, or on the surface to which it is applied; and which will retain its leafing property and luster after prolonged standing and exposure.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

In terms of broad inclusion, my invention contemplates new methods and materials for producing a bronzing composition having stable properties of leafing and luster, comprising a bronzing powder which is subjected to the combined action of a leafing agent, a stabilizing and brightening agent, and an anti-polymerization agent. The leafing, stabilizing and anti-polymerization agents are preferably combined in a prepared mixture suitable for addition to a bronzing powder or paste, or to a vehicle to which such powder or paste is to be added, or to a paint comprising a vehicle with which powder or paste has been mixed. When the prepared mixture is initially mixed with the powder or paste, or with the vehicle or the paint, a product is obtained in which the leafing property and luster will remain stable both before or after mixing in a paint. Also the prepared mixture may be added to a bronzing composition for restoring the leafing property and luster to a product in which those characteristics have become lost or damaged through age or exposure to injurious influences.

In terms of greater detail the bronzing material of my invention comprises a bronzing powder, such as aluminum powder or paste, which is subjected to the combined action of materials increasing the leafing property, luster and stability of the powder or paste. Those materials are preferably combined in a prepared agent and comprise a leafing agent, preferably stearic acid. Myristic acid may be substituted wholly or in part for the stearic acid. Other fatty acids of a similar nature such as the higher fatty acids derived from fats and oils, such as lauric acid, the fatty acids of rapeseed, linseed, or palm and also oleic acid and the fatty acids derived from tallow may be used, preferably in mixture with stearic acid. The latter named fatty acids in producing leafing and improve the penetration, adherence, and other properties of the film produced.

With the stearic acid or equivalent leafing agent is mixed a stabilizing and brightening agent. For that purpose I have found that Butyl Distolene, a commercial product composed chiefly of butyl oleate, is highly satisfactory. Butyl stearate has also been found to give excellent results. In general, the esters of the fatty acids, including the saturated fatty acids of the series $C_nH_{2n}O_2$ and the unsaturated monobasic fatty acids of the series $C_nH_{2n-2}O_2$, having any of the alkyl groups substituted for the acid hydrogen of the fatty acid, may be used as stabilizers and brighteners. However, many of these esters, while technically satisfactory, are impractical for commercial reasons. For example, the esters of the lower fatty acids, such as methyl or ethyl formate or acetate have boiling points so low and are so volatile as to be impractical for commercial use. Many of the esters of the higher and more complex fatty acids are rare; and are either not available, or the cost is prohibitive. For practical purposes, the boiling point of the ester should not be below 212° F. The esters of stearic acid, such as amyl stearate, propyl stearate, methyl stearate and ethyl stearate; and the butyl esters of the fatty acids of palm oil and of the fatty acid of sunflower seeds are especially satisfactory.

In order to retard or prevent polymerization in the vehicle of a bronzing paint I prefer to include in my prepared agent an ingredient which acts in the presence of and in conjunction with the fatty acid as an anti-polymerization agent. For that purpose I prefer to use a derivative of an amidine, such as diphenyl-guanidine or di-ortho-tolyl-guanidine. Phenol, or its derivatives and homologues, such as cresol, thymol, para- or ortho-hydroxy diphenyl may be used, as may also dihydric phenols, such as catechol or guaiacol. Cresol derivatives such as thio-cresol, meta-thio-cresol, and similar substances may be used. Arylamines such as aniline, mono-methyl-aniline, and naphthylene derivatives such as beta-naphthylamine, beta-thio-naphthol, and similar substances may be substituted. Mineral substances such as selenium, arsenic, sulphur, tellurium and their equivalents are also useful alone or in combination with one or more of the organic anti-polymerization agents.

The several ingredients of the mixture cooperate to produce a number of beneficial results. For example, where stearic acid alone produces only a temporary leafing property, the combination of stearic acid with butyl oleate or other equivalent ester of a fatty acid stabilizes the property. While the precise reaction is not fully understood, it is believed that loss of leafing is due largely to the reaction of the stearic acid with the vehicle and the production of soaps forming a film over the powder particles which impairs the leafing property. The reaction is a progressive one, and in time destroys the leafing property completely. The presence of a fatty acid ester retards such reaction, and tends to keep whatever film is formed in an open condition such that the leafing property is not materially affected by prolonged standing or by exposure to heat or moisture such as would destroy leafing in the absence of the fatty acid ester. At the same time and in like manner, the ester serves to preserve the luster of the powder, and prevents the dulling which otherwise occurs.

After the powder or paste is mixed with a vehicle having an oil or varnish base, the leafing property is impaired by the polymerization which commonly occurs. If allowed to stand for a material length of time, as in the case of ready-mixed paint, the polymerization causes the particles of bronzing powder to become encased in a coating of polymerized oil which destroys the leafing property. Here again the action is a progressive one, which may be accelerated by heat or moisture. The anti-polymerization agent of my invention acts to prevent or retard polymerization, and, in combination with the leafing and stabilizing agents, obtains a product which is substantially stable both as to leafing and luster.

The following compositions are illustrative of the prepared agent of my invention:

A. Butyl oleate — 100 Parts
   Diphenyl guanidine — 20
   Stearic acid — 40

B. Butyl myristate — 100
   Phenol — 10
   Diphenyl guanidine — 10
   Stearic acid — 20

C. Butyl oleate — 100
   Cresol — 10
   Stearic acid — 25
   Oleic acid — 35

In the foregoing examples the ingredients are mixed and heated together to about 200° F. after which they are allowed to cool and are ready for use. The quantities of the several ingredients may be varied through relatively wide limits, variations of as much as about 50% being possible without seriously impairing the effectiveness of the mixture.

For some purposes, particularly for use with vehicles comprising an oil and resin base, it has been found desirable to include in the mixture a moderate quantity of a natural or synthetic resin, for example a para-coumarone-indene resin such as Nevindine or Cumar gum. By way of illustration, the following compositions have been found to be highly effective.

D. Butyl stearate — 100 Parts
   Nevindine (R5) — 18
   Aniline — 2
   Stearic acid — 20

E. Butyl oleate — 50
   Mineral spirits — 50
   Cumar gum — 18
   Beta-naphthylamine — 2
   Stearic acid — 20

F. Methyl stearate — 50
   Nevindine (R5) — 50
   Cresol — 8
   Stearic acid — 18
   Oleic acid — 25

Where a gum such as Nevindine, or Cumar gum is included the mixture should be heated to about 300° F. in order to properly incorporate the gum in the mixture. The gum acts as a carrier for the anti-polymerization agent; and aids in obtaining an effective mixture with the vehicle of a coating composition.

Where it is desired to cheapen the product or increase its bulk, the prepared agent may be diluted with mineral spirits. In general, such dilution is not recommended, since it either requires the use of a higher percentage of the prepared agent, or causes an impairment of the stability of the bronzing composition to which it is added.

The prepared agent may be mixed directly with the bronzing powder or paint, or it may be added to a vehicle, or to a mixture of bronzing powder or paste with a vehicle. For example, the prepared agent above described may be incorporated with the bronzing powder in the ball mill during the process of flaking and polishing the powder. When so used, the prepared agent is substituted for the stearic acid heretofore ordinarily used in the ball mill in producing a bronzing paste. The agent may be diluted with mineral spirits in order to obtain the desired fluidity in the ball mill. Any excess liquid may be removed by evaporation after leaving the ball mill to reduce the mixture to a paste of the desired consistency.

Instead of mixing my prepared agent with the powder in a ball mill, the agent may be mixed with a bronzing powder by other methods. For example, by adding from 10 to 20 percent of my agent to a dry powder and subjecting the mixture to a shaking action, the agent may be uniformly distributed over the particles of powder. Upon such treatment, the mixture becomes loosely flaked, and will retain its leafing property and luster for prolonged periods and under severe conditions of heat and moisture.

Instead of initially mixing the prepared agent with the bronzing powder in a ball mill or otherwise, the powder may be flaked and polished with stearic acid in the ordinary manner and my agent added to the resulting paste. For most purposes 10% by weight of my agent added to and intimately mixed with a paste prepared with stearic acid results in a product which will retain the leafing property and luster of the powder for long periods of time and under extreme degrees of heat and moisture. The quantity of the prepared agent may be varied through wide limits. As little as about 2% materially improves the stability, luster and leafing property of the paste. The amount may be increased to 20% or more without impairing the resulting product.

If desired, the prepared agent may be added to a vehicle intended for use with a bronzing powder or paste. In that case, I prefer to add to any ordinary vehicle suitable for use in a bronzing paint about 5% by weight of my prepared agent. When bronzing powder or paste is then mixed with the vehicle, the ingredients of my prepared agent act upon the bronzing powder in the mixture and produce a stability of luster and leafing power comparable with the results obtained by initially mixing the prepared agent with the powder or paste. The amount of agent which is added may be varied from about 2% to 10% or more, if desired.

When the ordinary bronzing paste and ready mixed bronzing paints heretofore available on the market have been allowed to stand for some time, say two or three months, a material impairment of the leafing property and luster occurs. The impairment increases with the lapse of time; and is greatly accelerated by heat and moisture. Compositions exposed to the air lose their luster and leafing property in a very short time, sometimes within a few hours. When subjected to heat and/or moisture the utility of such products may be destroyed in only a few minutes.

Heretofore, products so impaired have been treated as useless, since no method of restoring the luster and leafing property has been known. The prepared agent of my present invention has the property of restoring leafing and luster and producing products in which those restored properties are stabilized. For that purpose, from 2 to 10 percent of the prepared agent of my invention is added and intimately mixed with the impaired product. In the case of bronzing paste in which the leafing property and/or luster has become impaired, such an addition of my prepared agent restores and stabilizes both the leafing property and the luster of the bronzing powder. After such treatment, the restored properties of leafing and luster remain stable. The product then may be kept indefinitely and may be subjected to severe conditions of heat and moisture, without material impairment.

In the case of ready mixed bronzing paints in which the leafing property and luster of the bronzing powder has become lost or seriously impaired, the addition of about 2 to 10 percent of the prepared agent of my invention restores and stabilizes both the leafing property and luster. The product, so restored, is then comparable with a freshly prepared product made in accordance with my invention.

While the prepared agent of my invention is adaptable for general use with bronzing compositions employing any of the vehicles commonly used for preparing bronzing paints, I have found that the ingredients of the composition may be incorporated in a vehicle base during the initial cooking thereof with highly desirable results; and that products so produced possess a number of superior qualities. By such treatment, the added ingredients of my invention become thoroughly incorporated with the vehicle, and when bronzing powder or paste is subsequently added to the vehicle a remarkably stable and effective coating material is produced.

A vehicle so prepared preferably has as its base a drying or semi-drying oil. If desired, the base may include suitable amounts of natural or synthetic gums or resins. Perilla oil has been found to be highly satisfactory. China-wood oil, linseed oil, oiticica oil, sardine oil, and similar drying or semidrying oils, or combinations thereof, may be used instead of perilla oil, or in combination therewith.

Any of the gums and resins commonly used in the manufacture of paints and varnishes may be added. The synthetic ester gums such as "Synthe-Copal Ester Gum," and the paracoumarone-indene resins such as "Nevindine" and Cumar gum have been found to be well suited for use in the vehicle of the present invention. Synthetic phenolic resins, alkyd resins, and modified resins of the phenolic and alkyd types, may be used, as for example: "Telac" (malic acid-formaldehyde reaction product), "Bakelite #4036" (phenol-formaldehyde resin), "Beckacite #1112" (phenol-formaldehyde resin modified with ester gum), or "Beck-Kohler #2000" (phenol-formaldehyde resin).

To the base are added suitable amounts of a leafing agent and a stabilizing and brightening agent selected from the respective groups above noted in connection with the separately prepared agent of my invention. In general, the amount of fatty acid and fatty acid ester added should be from 5 to 10 percent of the oil content of the vehicle; but the amount may be varied through a considerable range above and below those percentages.

In addition, suitable amounts of an anti-polymerization agent of the class above described is added. The anti-polymerization agent has the effect of inhibiting reaction of the oils, gums and resins with the bronzing powder, thereby preserving the luster of the powder in the vehicle. At the same time, the anti-polymerization agents in general, have the further property of preventing jelling of oils, such as China-wood oil, as a result of heat treatment. Because of that property, an effective blending of the fatty acid and ester with the heat treated vehicle is possible without impairment of the vehicle.

In the case of the mineral anti-polymerization agents, only a relatively small quantity is required. About one part of mineral per one hundred parts of oil is ample for most vehicles, but that amount may be substantially reduced or increased if desired. In the case of the organic anti-polymerization agents, about five to ten parts per one hundred parts of oil give satisfactory results in most cases, but greater or lesser amounts may be used to advantage in some cases.

The vehicle is preferably prepared by cooking the oil, or oil and gum or resin components, with the fatty acid and/or ester and anti-polymerization agent, to a temperature of about 450° to 500° F. in about 20 to 45 minutes. The mixture is then allowed to cool, and when the temperature has dropped to about 350° to 400° F., suitable amounts of a thinner such as mineral spirits, gasoline, naphtha, toluol, or other similar materials is stirred into the mixture. Ordinarily the amount of thinner approximately equals the volume of the cooked mixture, but the amount may be substantially increased or decreased in accordance with the consistency which is desired in the final product. In some cases, the thinner may be omitted entirely.

Suitable amounts of a drier, such as cobalt naphthenate, cobalt linoleate, or other drier may be added. The drier may be added before or during the heat treatment, or it may be added during the cooling period. One-half to two parts of drier per one hundred parts of the vehicle base is ordinarily sufficient.

The kind and proportions of the ingredients, and the manner in which they are combined, may be varied in many ways. The following typical examples illustrate various compositions which I have found to satisfactorily accomplish the purposes of my present invention:

|   | Parts |
|---|---|
| 1. Perilla oil | 560 |
| Myristic acid | 40 |
| Arsenic ($As_2O_3$) | 4 |
| Cobalt naphthenate (6%) | 30 |

Cook to 500° F. in 35 to 45 minutes, then allow to cool naturally. This mixture may be thinned to desired consistency while warm, or after cooling. Bronzing powder (1½ to 2 lbs. per gallon) may be added directly to the base vehicle, and thinner added at the time of use.

|   | Parts |
|---|---|
| 2. Ester gum | 200 |
| Perilla oil | 80 |
| Arsenic ($As_2O_3$) | 2 |
| Myristic acid | 20 |
| Mineral spirits | 200 |
| Gasoline | 100 |
| Cobalt (6%) naphthenate | 20 |

Cook the gum, oil and arsenic to about 500° F. in 23 to 30 minutes.

Add myristic acid on cooling to about 450° F.

Add mineral spirits and gasoline at about 350° F.

Add cobalt naphthenate while still warm.

|   | Parts |
|---|---|
| 3. Ester gum | 80 |
| Perilla oil | 200 |
| Diphenyl guanidine | 20 |
| Oleic acid | 20 |
| Cobalt (6%) naphthenate | 15 |

Cook to 500° F. in 25 to 30 minutes.

Add 300 parts mineral spirits on cooling to about 400° F.

| 4. Ester gum | Parts 80 |
|---|---|
| Perilla oil | 200 |
| Aniline | 20 |
| Oleic acid | 20 |
| Cobalt (6%) naphthenate | 15 |

Cook to 500° F. in 25 to 30 minutes.
Add 300 parts mineral spirits on cooling to about 400° F.

| 5. Alkyd resin modified with ester gum | Parts 80 |
|---|---|
| Linseed oil | 200 |
| As$_2$O$_3$ | 2 |
| Oleic acid | 20 |
| Cobalt naphthenate | 20 |

Cook to 500° F. in 30 minutes.
Thin with 300 parts mineral spirits.

| 6. Ester gum | Parts 80 |
|---|---|
| Perilla oil (raw) | 200 |
| Beta naphthylamine | 10–20 |
| (or monomethyl aniline) | 20 |
| Oleic acid | 20 |
| Cobalt naphthenate | 15 |

Cook to 500° F. in 24 to 25 minutes.
Thin at 400° F. with 300 parts mineral spirits.

| 7. Ester gum | Parts 80 |
|---|---|
| Perilla oil | 200 |
| As$_2$O$_3$ | 2 |
| Stearic acid | 20 |

Cook to 500° F. in 26 to 27 minutes.
Thin at 400° F. with 300 parts mineral spirits.

| 8. Ester gum | Parts 40 |
|---|---|
| Perilla oil | 120 |
| China-wood oil | 140 |
| Aniline | 20 |
| Butyl ester of palm fatty acid | 10 |

Cook to 500° F. in 23 to 24 minutes.
Cool to 300° F. and add 10 parts butyl ester of palm fatty acid, thin with 300 parts mineral spirits, and add 5 parts cobalt naphthenate.

The proportions noted in the foregoing examples may be varied within relatively wide limits; and equivalent materials may be substituted in part or in whole for the various materials specified in the examples. Fatty acid ester, for example butyl oleate or other alkyd ester such as may be used in the prepared agent above disclosed, may be added to the vehicles of Examples 1 to 7, inclusive, in amounts varying between relatively wide limits depending upon the properties which it is desired to impart to the product. The addition of such fatty acid ester improves the stability of the properties of leafing and luster of aluminum flakes mixed with the vehicle to produce an aluminum paint. At the same time, the fatty acid ester tends to retard drying of the film, and lessens its hardness. If maximum stability of leafing and luster is not essential, little or none of the fatty acid ester is required. Should leafing or luster become seriously impaired in a mixed aluminum paint produced from the vehicle, those properties may be restored by adding suitable amounts of the prepared agent of my invention at any time before the mixed paint is to be used.

Bronzing powder or paste is added to the finished vehicle, preferably in the proportion of about 1½ to 2 pounds per gallon. The mixture may be used immediately; or it may be packed in suitable containers and stored indefinitely without material deterioration.

The fatty acid and ester of fatty acid, not only serves to obtain stability of the leafing property and luster of the bronzing powder, but results in producing a superior film. For example, I have found that the presence of the fatty acid and ester of fatty acid causes increased penetration when the composition is applied to wood, concrete, and similar surfaces; and a firmer bond is therefore obtained. The vehicle of my invention also obtains improved adherence to metal and similar surfaces; and because of its flexibility and elasticity, has increased effectiveness and durability either as a primer, or as a finish coating. Because of the heat treatment and the composition of the vehicle, the film dries and sets substantially uniformly throughout, rather than from the surface as in the bronzing compositions heretofore commonly used. The composition is especially suitable for use upon prepared roofings. In that connection, the superior leafing properties of the bronzing powder in the vehicle insures an effective and durable coating which does not crack or "alligator."

The composition may be subjected to a temperature of about 200° F. without impairment of the leafing property or the luster of the bronzing powder. Also, the presence of moisture, either in the composition itself or on the surface to which it is applied, does not impair the appearance or the effectiveness of the film.

By varying the kinds and amounts of the oil and resin components of the vehicle, the characteristics of the film, such as hardness, and flexibility may be readily controlled, without affecting the leafing property and luster of the bronzing powder.

I claim:

1. A composition for mixing with bronzing materials for use in a paint or varnish vehicle comprising stearic acid, butyl oleate, and diphenyl guanidine.

2. A composition for mixing with bronzing materials for use in a paint or varnish vehicle comprising a mixture of about 40 parts of stearic acid, 100 parts of butyl oleate, and 20 parts of diphenyl guanidine.

3. A bronzing paste comprising a bronzing powder, a fatty acid of the class derived from fats and oils, and an alkyl ester of a monobasic fatty acid, said ester having a boiling point above about 212° F.

4. A bronzing paste comprising a bronzing powder, a fatty acid selected from the group consisting of stearic acid and myristic acid, an alkyl ester of a monobasic fatty acid, said ester having a boiling point above about 212° F., and an agent for inhibiting polymerization of materials contained in a vehicle when the paste is mixed therewith to produce a paint.

5. A coating composition comprising a vehicle base containing oil heat treated in the presence of an anti-polymerization agent and containing a fatty acid leafing agent of the class derived from fats and oils, and an alkyl ester of a monobasic fatty acid said ester having a boiling point above about 212° F., and a bronzing powder.

6. A coating composition comprising a vehicle base containing oil and resin heat treated in the presence of an anti-polymerization agent and having the property of drying as a hard permanent film, said base containing a fatty acid leafing agent selected from the group consisting of stearic acid and myristic acid, and an alkyl ester of a monobasic fatty acid said ester having a boiling point above about 212° F., and a bronzing powder.

7. The method of stabilizing a bronzing composition which comprises treating the composition with a mixture of a fatty acid leafing agent of the class derived from fats and oils, an alkyl ester of a monobasic fatty acid said ester having a boiling point above about 212° F., and an agent for inhibiting polymerization of film forming materials contained in the composition.

8. The method of restoring lost leafing property and luster to a bronzing composition which comprises mixing with the composition a mixture comprising a fatty acid leafing agent selected from the group consisting of stearic acid and myristic acid, an alkyl ester of a monobasic fatty acid, said ester having a boiling point above about 212° F., and an agent for inhibiting polymerization of film forming materials with which the bronzing material is mixed.

9. The method of preparing an agent for use in imparting, restoring and stabilizing the properties of leafing and luster in a bronzing composition in which aluminum flakes are mixed with a vehicle containing polymerizable material which comprises mixing stearic acid, an alkyl ester of a monobasic fatty acid, said ester having a boiling point above about 212° F., and an anti-polymerization agent, and heating the mixture to about 200° F.

10. A composition for mixing with aluminum bronzing materials for obtaining stable properties of leafing and luster of aluminum flakes when mixed with a vehicle containing polymerizable material which comprises a fatty acid of the class derived from fats and oils, and an alkyl ester of a monobasic fatty acid having a boiling point above about 212° F.

11. A composition for mixing with aluminum bronzing materials for obtaining stable properties of leafing and luster of aluminum flakes when mixed with a vehicle containing polymerizable material which comprises a fatty acid of the class derived from fats and oils, an alkyl ester of a monobasic fatty acid having a boiling point above about 212° F., and an agent having the property in the presence of said fatty acid of inhibiting polymerization of materials contained in the vehicle.

12. A composition for mixing with aluminum bronzing materials for obtaining stability of the property of leafing of aluminum flakes when mixed with a vehicle containing polymerizable material which consists essentially of a fatty acid selected from the group consisting of stearic acid and myristic acid, diphenyl guanidine, and a solvent thinner for the fatty acid and diphenyl guanidine.

13. The method of preparing a bronzing paint having stable leafing properties which comprises heat treating a vehicle base containing polymerizable material with an agent for inhibiting polymerization of said material, and mixing with the base a fatty acid of the class derived from fats and oils, an alkyl ester of a monobasic fatty acid, said ester having a boiling point above 212° F., and a bronzing powder.

14. The method of preparing a ready-mixed bronzing paint having stable leafing properties which comprises mixing with a vehicle containing polymerizable film forming materials and a bronzing powder about 2% to 10% of a separately compounded stabilizing composition comprising a fatty acid of the class derived from fats and oils, an anti-polymerization agent having the property in the presence of the fatty acid of inhibiting polymerization of the polymerizable materials, and a thinner which is a solvent for the fatty acid.

15. The method of restoring lost leafing property and luster to metallic particles when mixed with a film forming vehicle containing polymerizable material, which comprises treating the particles with a prepared agent comprising a fatty acid leafing agent of the class derived from fats and oils in an amount in excess of that normally required to obtain leafing in a freshly prepared product, an alkyl ester of a monobasic fatty acid, said ester having a boiling point above about 212° F., and an agent for inhibiting polymerization of polymerizable film forming materials contained in a vehicle for the metallic particles.

16. The method of restoring lost leafing property and luster to metallic particles when mixed with a vehicle containing polymerizable film forming materials which comprises subjecting the metallic particles to the combined and concurrent action of a fatty acid of the class derived from fats and oils in an amount in excess of that required to obtain leafing in a freshly prepared product, and an agent having the property in the presence of said fatty acid of inhibiting polymerization of the polymerizable materials in the vehicle.

17. As a composition of matter, a prepared agent adapted to be mixed with aluminum bronzing materials for stabilizing the leafing property of aluminum flakes after the same are mixed with a vehicle containing polymerizable material which consists essentially of a fatty acid of the class derived from fats ond oils, an anti-polymerization agent having the property in the presence of said fatty acid of inhibiting polymerization of the polymerizable material in the vehicle, and a solvent for the fatty acid and anti-polymerization agent, the fatty acid and anti-polymerization agent being dissolved in the solvent in the proportion of about 1 to 10 parts of fatty acid to 1 part of anti-polymerization agent.

18. As a composition of matter, a prepared agent adapted to be mixed with aluminum bronzing materials for imparting, restoring, and stabilizing the leafing properties of aluminum flakes in a vehicle containing polymerizable material which comprises a fatty acid of the class derived from fats and oils, diphenyl guanidine, and a solvent, the fatty acid and diphenyl guanidine being dissolved in the solvent in the proportion of about 2 to 3 parts of fatty acid to 1 to 2 parts of diphenyl guanidine.

19. The method of stabilizing the leafing properties of mixed aluminum paint in which aluminum flakes are mixed with a vehicle containing polymerizable material which comprises mixing with the paint about 2 to 10% of a prepared agent comprising a fatty acid of the class derived from fats and oils, an anti-polymerization agent having the property of acting in the presence of the fatty acid to inhibit polymerization of polymerizable material contained in the vehicle, and a solvent for the fatty acid and anti-polymerization agent, the fatty acid and anti-polymerization agent being dissolved in the solvent in the proportion of about 1 to 10 parts of fatty acid to 1 part of anti-polymerization agent.

CORNELIUS S. FLEMING.